United States Patent [19]
Horton et al.

[11] Patent Number: 5,862,877
[45] Date of Patent: Jan. 26, 1999

[54] CRADLE ASSEMBLY

[75] Inventors: Frank A. Horton, Rochester Hills; Gary A. Butynski, Clinton Township; Michael J. Devor, Bloomfield; Matthias Gille, Sterling Heights, all of Mich.

[73] Assignee: Cosma International Inc., Concord, Canada

[21] Appl. No.: 361,310

[22] Filed: Dec. 20, 1994

[51] Int. Cl.⁶ .............................. B62D 21/00; B21D 26/02
[52] U.S. Cl. ......................... 180/312; 280/781; 280/798; 29/421.1; 72/61; 403/408.1
[58] Field of Search .................................... 280/781, 788, 280/800, 796, 798; 180/299, 291, 297, 312; 296/194, 204; 72/61, 60; 29/421.1; 403/270, 272, 408.1; 411/546, 537, 383

[56] References Cited

U.S. PATENT DOCUMENTS

| | | | |
|---|---|---|---|
| 2,858,142 | 10/1958 | Schjolin et al. | 180/297 |
| 3,913,696 | 10/1975 | Kennedy et al. | 180/299 |
| 4,406,343 | 9/1983 | Harasaki | 180/312 |
| 4,730,474 | 3/1988 | Iwakura et al. | 72/61 |
| 4,787,793 | 11/1988 | Harris | 403/408.1 |
| 4,817,986 | 4/1989 | Kanazawa et al. | 180/312 |
| 4,840,053 | 6/1989 | Nakamura | 72/62 |
| 4,934,861 | 6/1990 | Weeks et al. | 403/408.1 |
| 5,333,775 | 8/1994 | Bruggemann et al. . | |
| 5,339,667 | 8/1994 | Shah et al. . | |
| 5,409,283 | 4/1995 | Ban | 180/312 |
| 5,561,902 | 10/1996 | Jacobs et al. | 72/61 |

FOREIGN PATENT DOCUMENTS

| | | |
|---|---|---|
| A 0 285 131 | 10/1988 | European Pat. Off. . |
| A 0 631 924 | 1/1995 | European Pat. Off. . |
| A 2 349 486 | 11/1977 | France . |

(List continued on next page.)

OTHER PUBLICATIONS

A. Ebbinghaus, Internal High Pressure Shaping, Industrie–Anzieger No. 20, Mar. 9, 1984, with English Language translation.

A. Ebbinghaus, Precision Workpieces in Lightweight Construction Manfactured by Internal High Pressure Shaping, Metallumformtechnik, Issue 1D/91, (1991), pp. 15–19, with English–Language translation.

English–Language translation –A. Ebbinghaus, Werkstatt und Betrieb, 123, (1990) 3, pp. 241–243.

English–Language translation –A. Ebbinghaus, Werkstatt und Betrieb, 122, (1989) 11, pp. 933–938.

*Primary Examiner*—Eric D. Culbreth
*Assistant Examiner*—Min Yu
*Attorney, Agent, or Firm*—Cushman Darby & Cushman IP Group of Pillsbury Madison & Sutro LLP

[57] ABSTRACT

A cradle assembly for a motor vehicle comprises a pair of spaced side frame members, a front cross frame member and a rear cross frame member. The front cross frame member is connected with front ends of the side frame members. The rear cross frame member extends between rear ends of the side frame members. The frame members are formed from tubular metal blanks by a hydroforming process in which each blank has fluid pressure provided internally thereto and thereby radially expanded so that the frame members have a peripheral configuration modified with respect to an original peripheral configuration of the associated blanks. The side frame members have the amount of metal per unit length varied during the hydroforming thereof so as to present at least one longitudinal area at which i) a transverse cross-section defined by the modified peripheral configuration is increased by more than 5% of an original cross-section and ii) the amount of metal per unit length is greater than at least some other areas of the side frame members. The side frame members each have a rigid suspension mount structure constructed and arranged to mount a vehicle suspension member to the associated side frame member thereof. The rigid suspension mount is rigidly secured to the associated side frame member at the at least one longitudinal area having the transverse cross-section defined by the modified peripheral configuration increased by more than 5% of the original cross-section.

22 Claims, 5 Drawing Sheets

FOREIGN PATENT DOCUMENTS

| | | |
|---|---|---|
| A 25 36 060 | 2/1977 | Germany . |
| 0025082 | 2/1991 | Japan ................................. 280/781 |
| 403109174 | 5/1991 | Japan ................................. 280/796 |
| 404092770 | 3/1992 | Japan ................................. 280/781 |
| 404118325 | 4/1992 | Japan ................................. 180/291 |
| 404215565 | 8/1992 | Japan ................................. 280/788 |
| 266578 | 2/1950 | Switzerland ....................... 280/781 |
| 8905246 | 6/1989 | WIPO ................................. 180/312 |

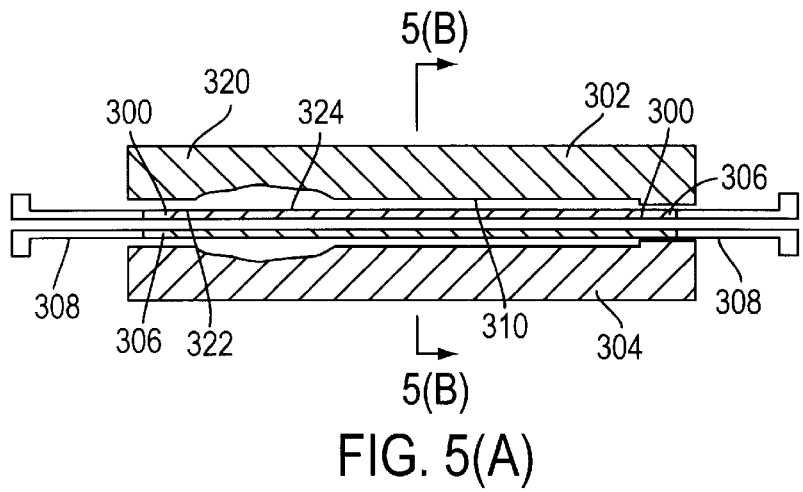
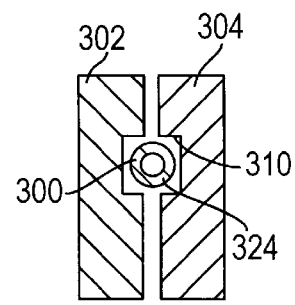
FIG. 5(A)
FIG. 5(B)
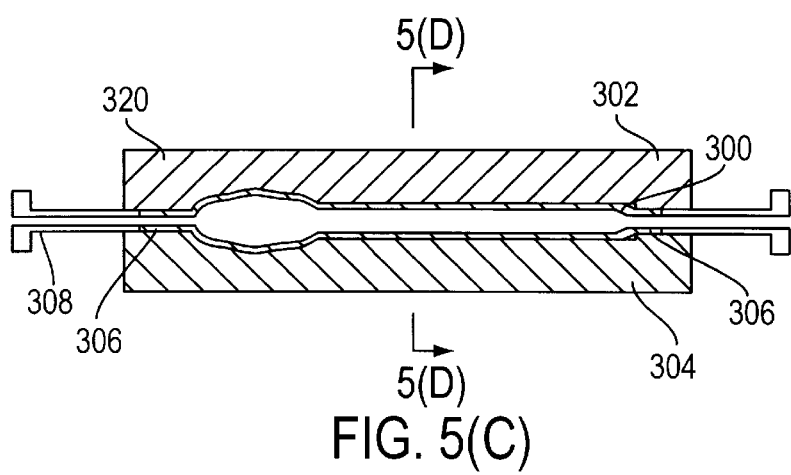
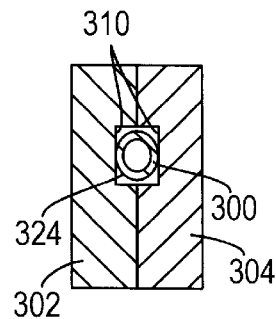
FIG. 5(C)
FIG. 5(D)
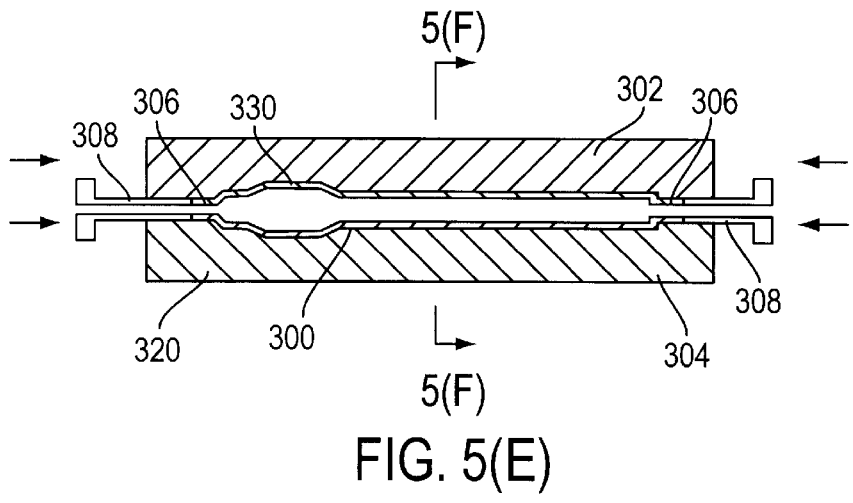
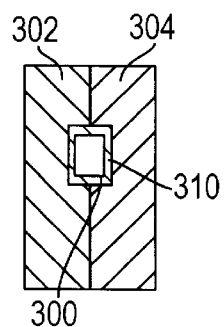
FIG. 5(E)
FIG. 5(F)

CRADLE ASSEMBLY

BACKGROUND OF THE INVENTION

The present invention relates to engine cradle assemblies for motor vehicles and a method for forming the same.

Typical motor vehicle frames are constructed as a ladder frame assembly or as a uni-body type. For a description of a recent advancement in ladder frame assemblies, see U.S. Pat. No. 5,561,902, hereby incorporated by reference. The present invention relates to an engine cradle assembly, which is to be secured to a forward portion of a uni-body vehicle frame. The engine cradle is typically provided beneath the vehicle engine and is adapted to have the engine mounted thereon. The engine cradle is also adapted to mount the vehicle front end suspension, steering hydraulics and any other vehicle components deemed appropriate.

The cradle assembly must be of a sturdy construction as it is exposed to large mechanical stresses due to the weight of the engine and the entire weight of the vehicle (and transport load) transferred through the cradle assembly to the front end suspension. The cradle assembly is typically made from a pair of spaced side frame members having front and rear ends, a front cross frame member connected across the front ends of the side frame members, and a rear cross frame member extending between the rear ends of the side frame members. A suspension mount structure is typically mounted on the spaced side frame members and is adapted to mount the vehicle front end suspension. Because of the aforementioned mechanical stresses, especially at the portion of the cradle assembly at which the vehicle suspension is to be mounted, it is desirable to manufacture the cradle assembly with particular "strong points" to accommodate for such large localized stresses.

While it is important to manufacture the cradle assembly with sufficient strength, it is equally important that the cradle assembly not be made from excessive amounts of metal, otherwise material costs and the vehicle weight will be unnecessarily high. Thus, for the most part, the frame members of the cradle assembly are hollow (tubular) in form.

The patent literature discloses that one way to manufacture tubular vehicle frame members is to utilize a hydroforming technique. For example, U.S. Pat. No. 5,339,667 discloses a hydroforming method in which a round tubular blank is placed in a hydroforming mold and then radially expanded by about 5% to form a frame member with a generally box-shaped cross sectional configuration. The process disclosed in this patent forms a completed frame member that has its wall thickness uniformly thinned and not strengthened at any particular location by increasing the amount of metal per unit length thereat. A hydroforming technique is also discussed in U.S. Pat. No. 5,333,775, which discloses a method of manufacturing certain portions of a hydroformed member stronger than others by providing plural tubular blank portions of different wall thicknesses welded end-to-end, so that the completed hydroformed member will have a greater wall thickness at desired locations. The method disclosed in this patent is rather tedious and does not produce hydroformed frame member by modifying a tubular blank during hydroforming process in which the amount of metal per unit length is varied so as to strengthen certain portions of the completed frame member relative to others. Moreover, none of the related art discloses the use of hydroforming to form a engine cradle assembly or that such an assembly should be strengthened by providing relatively more metal per unit length at a position which is to have a suspension mount structure secured thereat so as to accommodate the localized stresses thereat.

There is thus a need to manufacture a cradle assembly which overcomes the limitations noted above. It is therefore an object of the present invention to provide a cradle assembly which satisfies this need. In accordance with the principles of the present invention, there is provided a cradle assembly for a motor vehicle comprising a pair of spaced side frame members, a front cross frame member and a rear cross frame member. The side frame members have front and rear ends, and the front cross frame member is connected with the front ends of the side frame members. The rear cross frame member extends between the rear ends of the side frame members. The frame members are formed from tubular metal blanks by a hydroforming process in which each blank has fluid pressure provided internally thereto and thereby radially expanded so that the frame members have a peripheral configuration modified with respect to an original peripheral configuration of the associated blanks. The side frame members have the amount of metal per unit length varied during the hydroforming thereof so as to present at least one longitudinal area at which i) a transverse cross-section defined by the modified peripheral configuration is increased by more than 5% of an original cross-section and ii) the amount of metal per unit length is greater than at least some other areas of the side frame members. The side frame members each have a rigid suspension mount structure constructed and arranged to mount a vehicle suspension member to the associated side frame member thereof. The rigid suspension mount is rigidly secured to the associated side frame member at the at least one longitudinal area having the transverse cross-section defined by the modified peripheral configuration increased by more than 5% of the original cross-section.

It is a further object of the present invention to provide a method for manufacturing a cradle assembly in accordance with the principles of the present invention. The method according to the present invention comprises forming a pair of side frame members, a front cross-frame member and a rear cross-frame member. The frame members are formed from associated metallic tubular blanks in a hydroforming process in which each blank is formed by placing the metallic tubular blank into a cavity of a die mold, the die mold having an interior surface defining a shape of the cavity, and providing a fluid internally to the metallic tubular blank with sufficient pressure so as to expand the blank outwardly so that an exterior surface thereof is moved into peripheral surface engagement with the interior surface of the die mold to substantially conform the blank to the shape of the cavity, and so that the frame members have a peripheral configuration modified with respect to an original peripheral configuration of the associated tubular metal blanks. The side frame members have the amount of metal per unit length varied during the hydroforming thereof so as to present at least one longitudinal area at which i) a transverse cross-section defined by the modified peripheral configuration is increased by more than 5% of an original cross-section, and ii) the amount of metal per unit length is greater than that of the remainder of the side frame members. The method further comprises securing a suspension mount to each side frame member at the at least one longitudinal area thereof having the transverse cross-section defined by the modified peripheral configuration increased by more than 5% of the original cross-section; and connecting the front cross-frame member with forward ends of the side frame members, and the rear cross-frame member with rearward ends of the side frame members.

The present invention also relates to the connection between frame members, for example, the connection between the rear cross frame member and the respective rear ends of the side frame members in the instance in which the rear cross frame member and side frame members are not provided as an integrally formed assembly. Such a connection is typically accomplished with particular frame connectors which prohibit the exterior surfaces of the frame portions which are to be connected from establishing surface-to-surface contact. More particularly, each frame member is typically defined by a substantially rectangular transverse cross-section defined by two pairs of spaced opposite walls. Each of the walls includes an interior and exterior surface, and the frame member has fastener receptacles which enable it to be fastened with another frame member. The fastener receptacle is defined by aligned openings in the spaced opposite walls of at least one of the pairs of walls and a sleeve member extending through the aligned openings. The sleeve member serves as reinforcement for the aligned openings and has opposite ends thereof extending radially outwardly to define opposite flange portions engaging the exterior surface of each of the opposite walls. It can be appreciated that when another frame member is positioned to have the fastener receptacle thereof aligned with the fastener receptacle of the first frame member for securement therebetween with a fastener, flange portions of each receptacle are brought into engagement. This engagement creates a slight gap between the exterior facing surfaces of the flange members to be secured at the areas to be joined. This results in an inherent weakness in the joint, and thus in the entire cradle assembly or vehicle frame incorporating such type of connections.

It is thus a further object of the present invention to provide a cradle assembly which overcomes the aforementioned problem. In accordance with the principles of the present invention, there is provided a cradle assembly for a motor vehicle comprising a pair of spaced side frame members having front and rear ends, a front cross frame member connected with the front ends of the side frame members, and a rear cross frame member extending between the rear ends of the side frame members. The rear cross frame member and the side frame members each have a substantially rectangular transverse cross-section defined by a pair of spaced horizontal walls and a pair of spaced vertical walls, each of the walls including an interior and exterior surface. The rear cross frame member have fastener receptacles extending through the spaced horizontal walls thereof at opposite ends thereof, and the side frame members have fastener receptacles extending through the spaced horizontal walls thereof at the rear ends thereof. The fastener receptacles at the opposite ends of the rear cross frame member are aligned with respective fastener receptacles at the rear ends of the side frame members. Fasteners each extend through the respective aligned fastener receptacles at the opposite ends of the rear cross frame member and the rear ends of the side frame members. The fasteners fasten each of the opposite ends of the rear cross frame member with the respective rear ends of the side frame members. The rear cross frame member have the exterior surface of one the horizontal walls thereof disposed in surface-to-surface engagement at each opposite end thereof with the exterior surface of the respective rear end of one of the side frame members.

It can be appreciated that the development of the particular frame structure which permits this surface-to-surface engagement is also an important object of the present invention. It is thus an object of the present invention to provide a frame structure for use in a motor vehicle frame structure, such as a cradle assembly. The frame structure comprises an elongate frame member having a substantially rectangular transverse cross-section defined by two pairs of spaced opposite walls. Each of the walls includes an interior and exterior surface. The frame member has aligned openings in the spaced opposite walls of at least one of the pairs of walls. In addition, a sleeve member extends between the aligned openings and has one end thereof annularly welded to the interior surface of one of the walls within the at least one pair about the opening therein. The sleeve member includes an intermediate portion extending from the one end through the interior of the frame member and outwardly from the interior of the frame member through the aligned opening in the other of the walls within the at least one pair. The sleeve member has an opposite end extending radially outwardly so as to define a flange portion engaging the exterior surface of the other of the walls about said aligned opening therein.

The principles of the present invention will best be understood by reference to the following description and the appended claims.

BRIEF DESCRIPTION OF THE DRAWINGS

FIGS. 5A–5F are sectional views taken through the mould assembly and tubular blank used in forming the frame members, illustrating the hydroforming process used to manufacture the cradle assembly in accordance with the principles of the present invention.

DETAILED DESCRIPTION OF THE INVENTION

Figure 1:
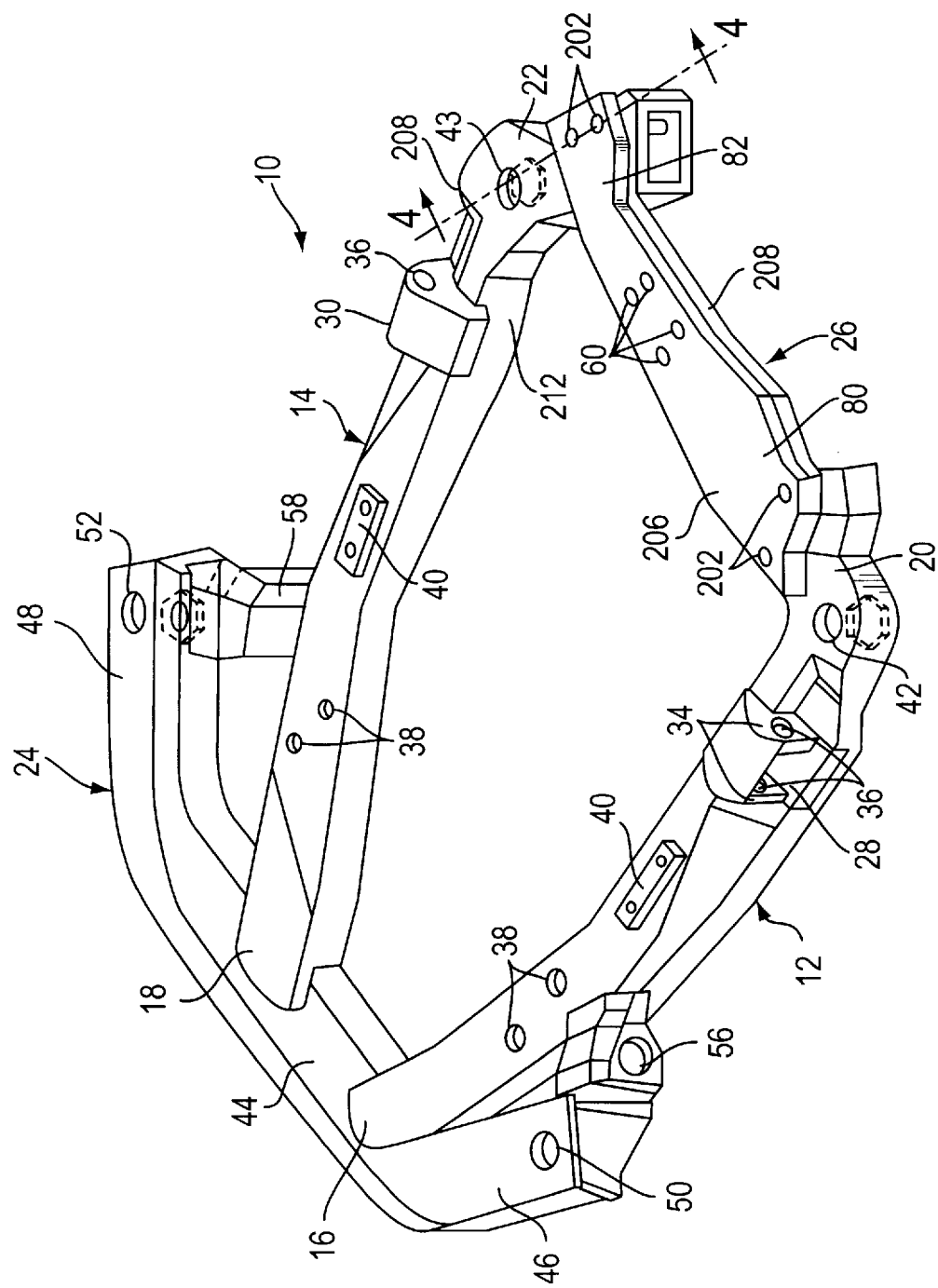
FIG. 1 is a perspective view showing a cradle assembly manufactured in accordance with the principles of the present invention.

Shown generally in FIG. 1 is a cradle assembly, shown generally at 10, manufactured in accordance with the principles of the present invention. The cradle assembly 10 has a strong, sturdy construction, and is adapted to mount various motor vehicle components, such as the front end suspension, vehicle engine and transmission. The cradle assembly 10 includes a pair of spaced side frame members 12 and 14 having respective front ends 16 and 18, and respective rear ends 20 and 22. The cradle assembly further includes a front cross-frame member 24 connected across the front ends 16 and 18 of the side frame members. A rear cross-frame member 26 extends between the rear ends 20 and 22 of the side frame members. Each of the frame members is formed from a tubular metal blank during a hydroforming process, which will be described in greater detail later.

The side frame members 12 and 14 include respective suspension mounts 28 and 30 rigidly secured thereto preferably by welding. Suspension mounts 28 and 30 are constructed in such fashion to permit the front end suspension to be pivotally connected therewith. For example, as shown, the suspension mounts are provided with a pair of parallel side brackets 34 having aligned holes 36, defining a pivot axis for pivotal suspension strut members.

The side frame members also include engine mounting holes 38 for mounting the vehicle engine, sway bars 40, and vehicle frame fastener receiving portions 42 and 43 disposed at rear ends 20 and 22, respectively, for enabling the cradle assembly to be secured with a vehicle frame.

The front cross-member 24 includes a central portion 44 to which the front ends 16 and 18 of the side frame members are welded. The front frame member also includes opposite end portions 46 and 48 extending rearwardly and laterally outwards from the front end of the associated side frame member. The opposite end portions 46 and 48 contain vehicle frame fastener receiving portions 50 and 52 similar to those at the rear ends of the side frame members. The fastener receiving portions 50 and 52 of the front cross-frame member 24 cooperate with the fastener receiving portions 42 and 43 in the side frame members 12 and 14 to enable the entire cradle assembly to be mounted on the forward end of the vehicle frame.

Rigidly secured between each end portion of the front frame member and the associated side frame member are brace members 56 and 58, preferably welded between the front frame end portion and the associated side frame member.

Figure 2:
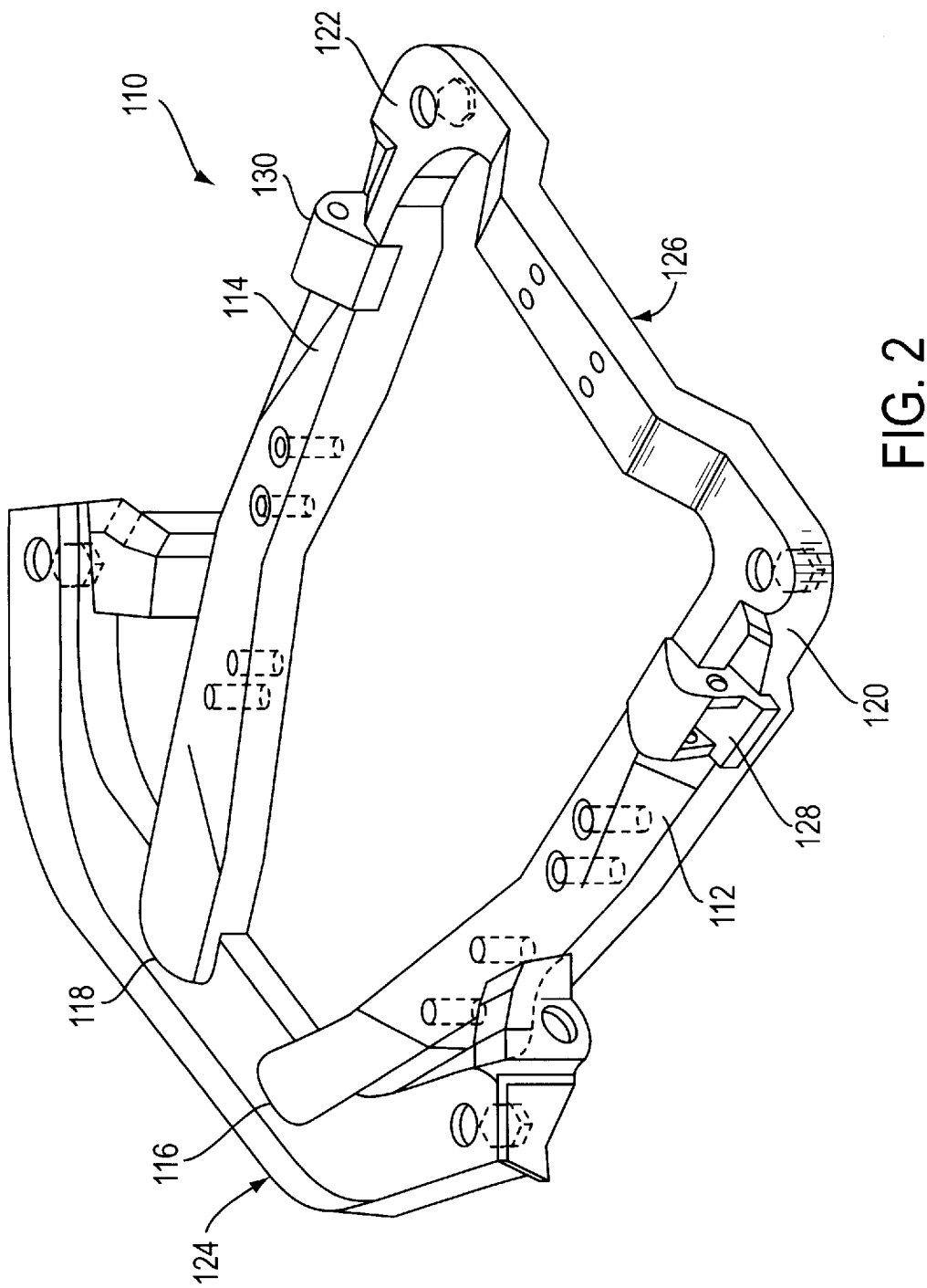
FIG. 2 is a perspective view showing a second embodiment of the cradle assembly manufactured in accordance with the principles of the present invention.

The rear cross-frame member 26 contains transmission mounting holes 60, and may be bolted at opposite ends thereof to rear ends 20 and 22 of the respective side frame members 12 and 14. As an alternative arrangement, shown in FIG. 2, a cradle assembly 110 may have a rear cross-frame member 126 which is integrally formed with the rearward ends 120 and 122 of respective side frame members 112 and 114. As can be appreciated from FIG. 2, the cradle assembly 110 is similar in all other respects to the cradle assembly 10 shown in FIG. 1. For example, FIG. 2 shows the forward ends 116, 118 of the respective side frame members 112, 114 welded to the front cross frame member 124, and also shows suspension mounts 128 and 130 connected with the respective side frame members 112, 114 at the longitudinal area or portion of the side frame members expanded by hydroforming in the manner and extent to be described in greater detail later. This alternative construction can also be completed in a hydroforming process, which will be described in greater detail later.

Figure 3:
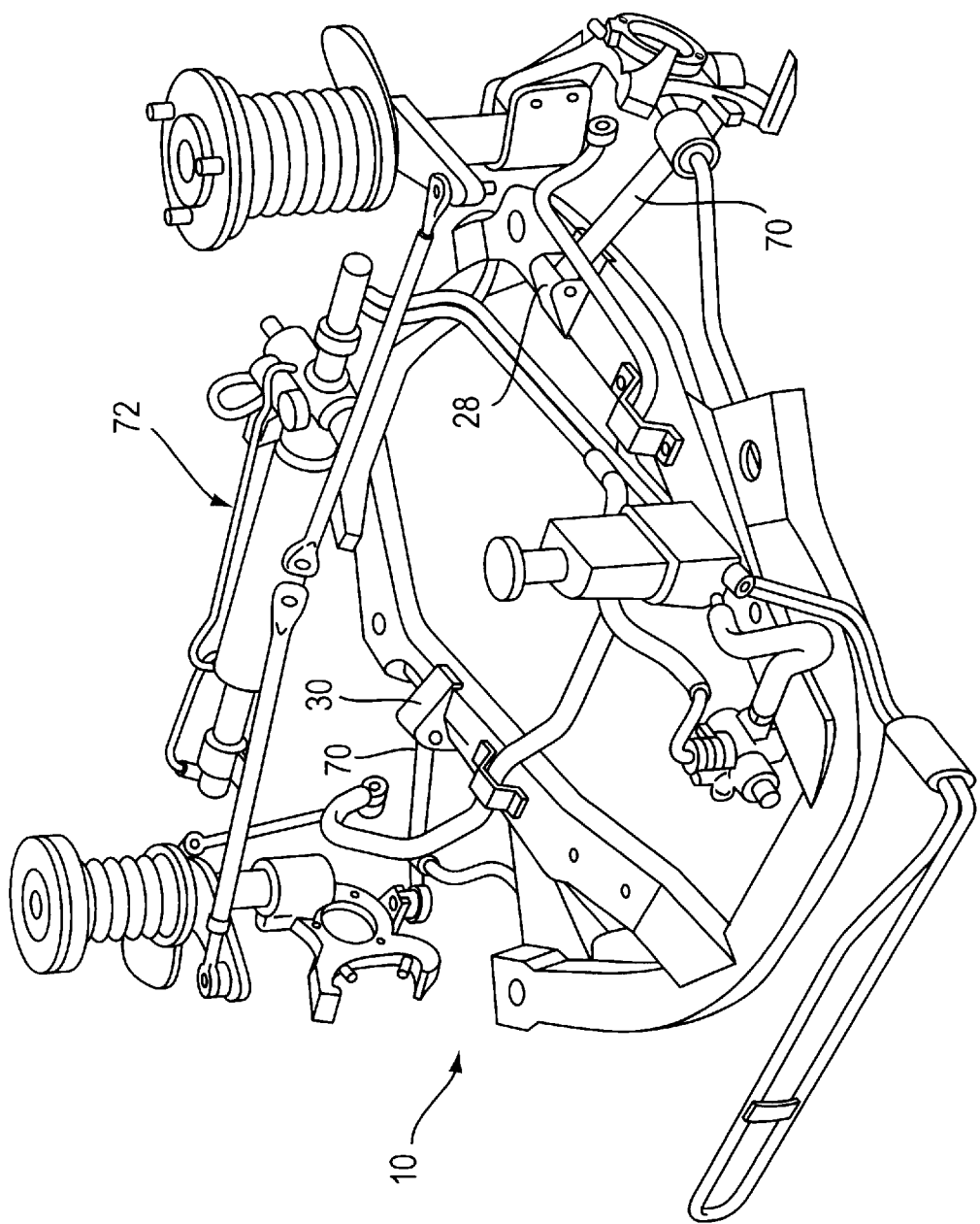
FIG. 3 is a perspective view showing the cradle assembly of the present invention mounting various vehicle components.

FIG. 3 is a perspective view showing the cradle assembly 10 mounting various vehicle components, including pivotal suspension control arm strut members 70 mounted on the cradle assembly suspension mounts 28 and 30, and steering hydraulic assembly 72.

Figure 4:
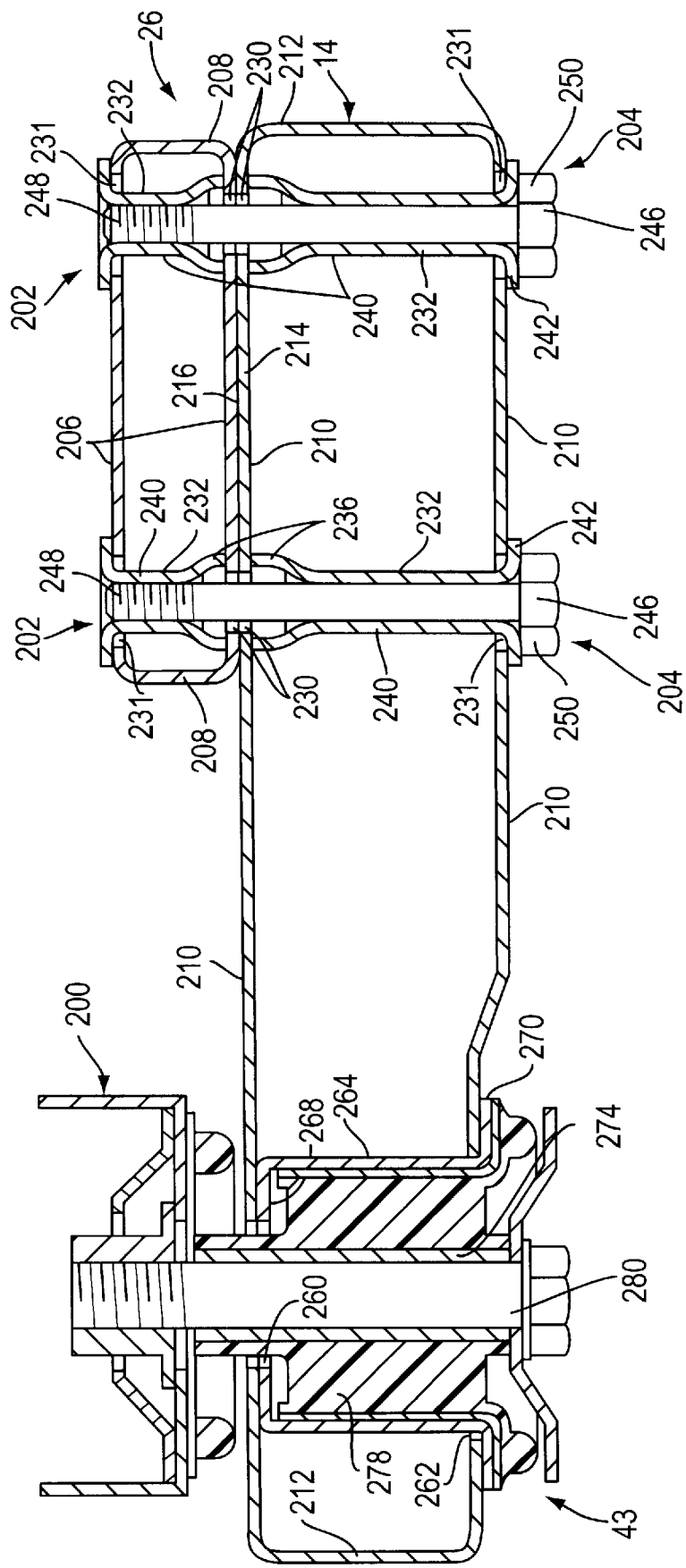
FIG. 4 is a sectional view showing the connection of the cradle assembly with the vehicle frame as would be viewed along the line 4—4 of FIG. 1 when the cradle assembly is attached to the vehicle frame.

In FIG. 4, there is shown a sectional view taken through line 4—4 in FIG. 1, and further including a resilient frame mounting assembly 200, which is not shown in FIG. 1. The particular construction in FIG. 4 permits the rear cross-frame member 26 to be easily connected and disconnected to the opposite rear ends 20 and 22 of the side frame members 12 and 14. It similarly allows the entire cradle assembly 10 to be mounted on the vehicle frame via resilient frame mounting assembly 200 of the frame. As can be appreciated from FIGS. 1 and 4, the rear cross-frame member 26 includes fastener receptacles, shown generally at 202 in FIG. 4, extending therethrough at the end 82 thereof. It can be appreciated, that the opposite end 80 has the same fastener receptacles extending therethrough. Similarly, the side frame members have fastener receptacles 204 extending therethrough at the rearward ends 20 and 22 thereof (end 22 being shown in FIG. 4). The fastener receptacles 204 at the rearward ends of the side frame members are aligned with the fastener receptacles 202 at the opposite ends of the rear cross-frame member. An appropriate fastener extends through the respective pairs of aligned fastener receptacles to thereby fasten each of the opposite ends of the rear cross-frame member 26 to the respective rear ends 20 and 22 of the side frame members.

As shown, the rear cross-frame member 26 and the side frame members 12 and 14 each has a substantially rectangular cross-section, the cross-section of the rear cross-frame member 26 being defined by a pair of spaced horizontal walls 206 and a pair of spaced vertical walls 208. Similarly, each of the side frame members consists of a pair of spaced horizontal walls 210 and a pair of spaced vertical walls 212. The rear cross-frame member 26 has one of its horizontal walls (the lower wall in FIG. 4) with its exterior surface 214 disposed in surface-to-surface contact at the opposite ends thereof with a respective exterior surface 216 of one of the horizontal walls 210 (the upper horizontal wall in FIG. 4) of respective side frame rear ends.

By enabling a portion of the exterior surface 214 of the rear cross-frame member to be in surface-to-surface engagement with a portion of exterior surface 216 of the respective side frame members, the connection between the rear-cross frame member 26 and the opposite side frame members 12 and 14 is sturdier than where a space is provided therebetween.

To provide this surface-to-surface engagement, each fastener receptacle 204 is defined by vertically aligned openings 230, 231 in the spaced horizontal walls of each frame member. The fastener receptacles also include a cylindrical fastener sleeve 232 extending between the vertically aligned openings 230, 231. Each sleeve 232 has a generally constant diameter along its intermediate portion 240, and an enlarged diameter portion at one end 236 thereof annularly welded to the interior surface of the associated frame member about one of the aligned openings 230 in the horizontal wall disposed in a surface-to-surface engagement with the exterior surface of the connected frame member. The intermediate portion 240 of each fastener sleeve extends through the associated frame member and through the other vertically aligned opening 231 of the associated fastener receptacle 204. It can be appreciated that, as shown in FIG. 4, opening 231 is slightly larger than opening 230. The larger opening 231 allows the enlarged diameter forward portion 236 to be inserted into the interior of the associated frame member, but not through the smaller opening 230 in the opposite wall. The fastener sleeve has an end opposite the end 236 which extends radially outward so as to define a flange 242 disposed in surface engagement with the exterior surface of the associated frame member about the vertically aligned opening 231 in the horizontal wall spaced from the wall in surface-to-surface engagement with the connected frame member.

It can be appreciated that because ends 236 are annularly welded to the interior surfaces of the walls of the respective frame members which are brought together, and because ends 236 do not extend through the openings 230 at said walls, there is no interference between the surfaces of engagement, and no gap is formed therebetween.

As shown in FIG. 4, the fastener receptacles 204 in the rear-cross frame member and in the side frame members 14 are vertically aligned so that the appropriate fasteners, in the form of bolts 246, each extend through the aligned fastener receptacles to thereby fasten the opposite ends 80 and 82 of the rear-cross frame member 26 to the respective rear ends of the side frame members 12 and 14. Bolts 246 have threaded ends 248 which are threaded to intermediate portions 240 of the respective fastener sleeves 232 in the rear-cross frame member 26. The fasteners further comprise a fastener head 250 which engages the flange 242 of the fastener sleeve 232 extending through side frame member 14. When fasteners 246 are tightened into the threaded intermediate portions 240, the fasteners rigidly secure the exterior surfaces 214 and 216 in surface-to-surface engagement. It can be appreciated that the fastener heads 250 can be inverted to engage the respective flanges 242 of the rear-cross frame member if the intermediate portion 240 of the fastener sleeves 232 which extend through the side frame members are threaded to receive the threaded end 248 of the bolts.

Next will be described the manner in which cradle assembly 10 is fastened with the vehicle frame. A portion of the vehicle frame is generally indicated by the resilient frame mounting assembly 200 thereof, shown in FIG. 4. More specifically, frame fastener receiving portions 42 and 43 in the rear ends 20 and 22 of the side frame members, and the frame fastener receiving portions 50 and 52 at the opposite ends portions 46 and 48 of the front cross-frame member 24 each include a pair of vertically aligned openings 260 and 262, as shown in FIG. 4, and a fastener sleeve 264 extending between the openings. Each fastener sleeve 264 has one end 268 thereof annularly welded to the interior surface of the associated frame member about the opening 260 in the horizontal wall 210 which is to engage the resilient frame mounting assembly 200 of the vehicle frame. The fastener sleeve also includes an opposite end extending radially outwardly to define a flange 270 disposed in surface engagement with the exterior surface of the associated frame member (for example, side frame member 14 in FIG. 4) about the opening 262 in the horizontal wall 210 spaced from the wall which is to engage the vehicle frame. Each fastener receiving portion is adapted to enable the cradle assembly to be secured with the vehicle, and may include inner and outer interior sleeves 274 extending through the fastener sleeves 264. Preferably, a resilient material 278 is disposed between the fastener sleeves 264, and a fastener, in the form of a bolt 280, extends through the inner interior sleeve to secure the associated side frame member with the resilient frame mounting assembly 200 of the vehicle frame. It can be appreciated that the interior sleeves 274, resilient material 278, and bolt 280 can be considered to be part of frame mounting assembly 200 and not part of the cradle assembly of the present invention.

Shown in FIGS. 5A–5F is an apparatus used in forming the frame members of cradle assembly of the present invention. More specifically, the side frame members, front cross-frame member, and rear cross-frame member are formed from tubular metal blanks during a hydroforming process in which each blank has fluid pressure provided internally thereto so that the respective blank is radially expanded into peripheral surface engagement with an interior mold surface so that the blank is radially expanded an average extent preferably >5% and so that the expanded blank has a generally uniform wall thickness throughout. The blanks in their initial form generally have a constant amount of metal per unit length and are formed during the hydroforming process into frame members having a peripheral configuration modified with respect to the peripheral configuration of the original blank. The side frame members 12 and 14 have the amount of metal per unit length varied so as to present one or more longitudinal areas at which a transverse cross-section defined by the modified peripheral configuration is increased by more than 5% of the original cross-section defined by the peripheral configuration of the original tubular metal blank, and at which the amount of metal per unit length is greater than that of the remainder of the formed frame members. More specifically, it is preferred that the areas of side frame members 12 and 14 which mount the respective suspension mounts 28 and 30 be provided with more metal per unit length than that which is provided by the original blank, and that such areas are expanded by more than 5% of the original cross-section. This stretching of metal and the increase in the amount of metal per unit length increases the strength of the side frame members at those particular locations.

FIGS. 5A–5F will now be described in greater detail. As shown in FIG. 5A, a tubular blank 300, preferably bent slightly in accordance with the intended shape of the frame member to be formed, is inserted between cooperating die halves 302 and 304. The blank can be manufactured by any known process. Preferably, the blank is formed by rolling a sheet of metallic material into a complete closed tubular section and then seam welding it. Typically, the tubular member 300 is pre-bent mechanically, for example, by use of mandrels in a CNC (computer numerically controlled) bending machine. After the tubular member 300 is inserted into the die, the die halves are then closed, as shown in FIGS. 5C and 5D, and hydroforming ports 308 are engaged with opposite ends 306 of the tubular blank 300, and sealed thereto. As the die halves 302 and 304 are moved towards one another, the tube 300 is slightly crushed, for example, into an oval cross-sectional shape, as shown in FIG. 5D.

Next, high pressure water, of approximately 10,000 PSI is provided through the hydroforming ports 308 and into the inner confines of the tubular blank 300. This high pressure causes the tubular blank to expand outwardly into engagement with the interior surface 310 defining the cavity within the die. This causes the tubular blank to take a substantially rectangular cross-sectional shape that conforms to the interior surface 310 of the die (for example, see FIG. 5F).

As the high pressure fluid is provided into the tubular structure, hydroforming ports 308 are forced inwardly against the opposite ends 306 of the blank to replenish the wall thickness of the metal as it expands into contact with the inner surface 310 of the die. During the hydroforming process, the amount of metal per unit length of tube is varied. More specifically, as the linear exterior circumference is outwardly expanded and metal is replenished from the side portions, the wall thickness is maintained within ±10% of the original blank so that more metal per unit length is provided at all areas of expansion. In the areas of greatest expansion, the exterior surface can be increased by more than 26%, while the wall thickness is maintained within the ±10% range.

Although slightly exaggerated, it can be appreciated that longitudinal area 330 of the member formed in FIG. 5E represents a portion of either side frame member which is expanded by more than 5% to provide the side frame member with sufficient strength thereat. This area 330 is well suited to be utilized as the area on the side frame member at which one of the suspension mounts 28 or 30 is mounted, in accordance with the principles of the present invention as described hereinbefore. It can be appreciated that it is not necessary for the area 330 to be the only area of expansion greater than 5%, nor is it necessary for the area 330 to be the area of greatest expansion along the side frame member. However, the latter is most preferable because the portion on the side frame members which is to mount the suspension mount is subjected to the greatest amount of stress in the cradle assembly.

In FIG. 5E it can be seen that the ends 306 are deformed as a result of the hydroforming process. Preferably these ends are cut off in a subsequent process before the hydroformed assembly is incorporated into the cradle assembly.

A similar hydroforming molding technique to that employed herein is disclosed in greater detail, for example, in "Industrieanzeiger" No. 20 of Mar. 9, 1984; and "Metallumformtechnik", Issue 1D/91, zp. 15 ff: A. Ebbinghaus: "Precision Workpieces in Light Construction, Manufactured Through Internal High Pressure Mouldings"; and "Werkstatt und Betrieb" 123 (1990), 3, P. 241–243: A. Ebbinghaus: "Economic Construction with Internal High Pressure Moulded Precision Workpieces": and "Werkstatt und Betrieb" 122 (1991), 11 (1989), P. 933–938, the above publications being fully incorporated herein by reference.

In the embodiment shown in FIG. 1, there are four separate frame members, which are formed by hydroforming four separate tubular blanks. The four frame members are then assembled into the four sided figure, as described hereinabove. In the embodiment of FIG. 2, however, it can be appreciate that the four-sided figure is formed from only two blanks, one blank being formed into the front-cross frame member 24, and the other blank being formed into the side frame members 112, 114, and the rear-cross frame member 126 as an integral unit. More specifically, with respect to the embodiment shown in FIG. 2, a substantially U-shaped tubular blank is provided and inserted into a molding die. The U-shaped tubular blank is hydroformed so that the bight portion thereof is formed into the rear-cross frame member 126 and the leg portions thereof are formed into the side frame members 112 and 114. The opposite ends of the leg portions of the U-shaped tubular blank are eventually formed into the front ends 116 and 118 of the respective side frame members 112 and 114. During the hydroforming process, the opposite ends of the U-shaped blank are pushed inwardly by the opposite hydroforming ports (such as ports 308 in FIGS. 5A–5F) to replenish the wall thickness of the metal as the blank is expanded. As with the embodiment shown in FIG. 1, the side frame members 112 and 114 are provided with respective suspension mounts 128 and 130 at longitudinal areas on the side frame members expanded by more than 5%.

While the invention has been illustrated and detailed in detail in the drawings and foregoing description, the same is to be considered as illustrative and not limiting in character, it being understood that the preferred embodiments have been shown and described and that all changes and modifications that come within the spirit and scope of the appended claims are to be protected.

What is claimed is:

1. A cradle assembly for a motor vehicle comprising:

a pair of spaced side frame members having front and rear ends;

a front cross frame member extending between the front ends of said side frame members; and a rear cross frame member extending between the rear ends of said side frame members, said frame members being formed from tubular metal blanks in a hydroforming process in which each blank has fluid pressure provided internally thereto and thereby radially expanded so that the frame members have a peripheral configuration modified with respect to an original peripheral configuration of the tubular metal blanks, said side frame members having an amount of metal per unit length varied during the hydroforming process thereof so as to present at least one longitudinal portion at which i) a transverse cross-section defined by the modified peripheral configuration is increased by more than 5% of an original cross-section, ii) a wall thickness of the modified peripheral configuration is within ±10% of an original wall thickness, and iii) the amount of metal per unit length is greater than at least some other longitudinal portions of said side frame members, and said side frame members each having an associated rigid suspension mount structure constructed and arranged to mount a vehicle suspension member thereon, each said rigid suspension mount structure being rigidly secured to the associated side frame member at said at least one longitudinal portion having said transverse cross-section increased by more than 5% of the original cross-section and said wall thickness within ±10% of the original wall thickness.

2. The cradle assembly according to claim 1, wherein said front cross frame member includes a central portion to which the front ends of the side frame members are welded, and opposite end portions extending rearwardly and laterally outwards from the front ends of the side frame members, the opposite end portions being constructed and arranged to enable the cradle assembly to be secured with a vehicle frame.

3. The cradle assembly according to claim 2, further comprising a brace member rigidly welded between each end portion of the front cross frame member and the associated side frame member.

4. The cradle assembly according to claim 3, wherein said front cross frame member has the amount of metal per unit length varied so that the end portions of the front cross frame member at which the brace members are welded each have i) a transverse cross-section defined by the modified peripheral configuration increased by more than 5% of the original cross-section, and ii) the amount of metal per unit length being greater than that of the central portion of the front cross frame member.

5. The cradle assembly according to claim 1, wherein said rear cross frame member has fastener receptacles extending therethrough at opposite ends thereof, and wherein said side frame members have fastener receptacles extending therethrough at said rear ends thereof, said fastener receptacles at said opposite ends of the rear cross frame member being aligned with the fastener receptacles at respective rear ends of the side frame members, and further comprising fasteners extending through the aligned fastener receptacles to thereby fasten the opposite ends of said rear cross frame member to the respective rear ends of the side frame members.

6. The cradle assembly according to claim 5, wherein said rear cross frame member and said side frame members each have a substantially rectangular cross-section defined by a pair of spaced horizontal walls and a pair of spaced vertical walls, each of said walls including an interior and exterior surface, said rear cross member having the exterior surface of one of said horizontal walls thereof disposed in surface-to-surface engagement at said opposite ends thereof with the exterior surface of the respective rear ends of said side frame members.

7. The cradle assembly according to claim 6, wherein said fastener receptacles in said frame members are defined by vertically aligned openings in said spaced horizontal walls and fastener receiving sleeve members extending between said openings, said sleeve members each having one end thereof annularly welded to the interior surface of the associated frame member about one of said openings in the horizontal wall disposed in surface-to-surface engagement, said sleeve member including an intermediate portion extending from said one end through the associated frame member and through the vertically aligned opening in the horizontal wall spaced from the wall in surface-to-surface engagement, said sleeve member having an opposite end extending radially outwardly so as to define a flange engaging the exterior surface of the associated frame member about said vertically aligned opening in the horizontal wall spaced from the wall in surface-to-surface engagement.

8. The cradle assembly according to claim 7, wherein said aligned fastener receptacles at the opposite ends of the rear cross frame member and at said respective rear ends of the side frame members have one of the sleeve members thereof provided with threads along the intermediate portion thereof, and wherein said fasteners each comprise a threaded stem constructed and arranged to be threadedly engaged with the threaded intermediate portion of said one of the sleeve members, and a fastener head construct ed to engage the flange of the sleeve member aligned with the sleeve member provided with said threaded intermediate portion to enable said fastener to pull the exterior surfaces disposed in surface-to-surface engagement into rigidly fixed engagement with one another when said fastener is tightened.

9. The cradle assembly according to claim 2, wherein said rear ends of said side frame members and opposite ends of said front cross frame member are constructed and arranged to enable said cradle assembly to be secured with the vehicle frame, said side frame members and said front cross frame member each having a substantially rectangular cross-section defined by a pair of spaced horizontal walls and a pair of spaced vertical walls, each of said walls including an interior and exterior surface, said rear ends of the side frame members and the opposite ends of the front cross frame member each including vehicle frame fastener receiving portions for securing the cradle assembly with the vehicle frame, said vehicle frame fastener receiving portions each including vertically aligned openings in said spaced horizontal walls of the associated frame member and a sleeve member extending between said openings, said sleeve members each having one end annularly welded to the interior surface of the associated frame member about said opening in one of the horizontal walls which is to engage the vehicle frame, said sleeve member including an intermediate portion extending from the annular weld through the associated frame member and through the vertically aligned opening in the horizontal wall spaced from the wall which is to engage the vehicle frame, said sleeve member having an opposite end extending radially outwardly to define a flange engaging the exterior surface of the associated frame member about the vertically aligned opening in the horizontal wall spaced from the wall which is to engage the vehicle frame.

10. The cradle assembly according to claim 9, wherein said vehicle frame fastener receiving portions each further include concentrically disposed inner and outer interior sleeves extending concentrically within each of the sleeve members, said vehicle frame fastener receiving portions further including a resilient material disposed between said interior sleeves, said inner interior sleeve being adapted to receive a fastener therethrough to secure the associated frame member with the vehicle frame.

11. The cradle assembly according to claim 1, wherein said rear cross frame member extending between said rear ends of the side frame members is integrally formed with the side frame members from a single substantially U-shaped tubular metal blank during said hydroforming process in which fluid pressure is provided internally to the U-shaped blank so as to radially expand the blank into peripheral surface engagement with an interior mold surface, said U-shaped blank including a bight portion and a pair of opposite leg portions, said bight portion of said U-shaped blank being formed into the rear cross frame member and said opposite leg portions of the U-shaped blank being formed into said side frame members.

12. The cradle assembly according to claim 1, wherein the at least one longitudinal portions at which said rigid suspension mount structure is rigidly secured is expanded to an extent greater than all other longitudinal portions of the associated side frame member.

13. The cradle assembly as claimed in claim 1, wherein said at least one longitudinal portion has said transverse cross-section increased by more than 26% of the original cross-section.

14. A method for manufacturing a cradle assembly for a motor vehicle, comprising:

forming a pair of side frame members, a front cross frame member, and a rear cross frame member, said front cross frame member, said rear cross frame member, and said side frame members being formed from metallic tubular blanks in a hydroforming process in which each blank is formed by placing the metallic tubular blank into a cavity of a die mold, said die mold having an interior surface defining a shape of the cavity; and providing a fluid internally to the metallic tubular blank with sufficient pressure so as to expand the metallic tubular blank outwardly so that an exterior surface thereof is moved into peripheral surface engagement with the interior surface of the die mold to substantially conform the metallic tubular blank to the shape of the cavity, and so that the formed frame member has a peripheral configuration modified with respect to an original peripheral configuration of the associated tubular metal blank, said side frame members having an amount of metal per unit length varied during the hydroforming process so that at least one longitudinal portion thereof has i) a transverse cross-section defined by the modified peripheral configuration increased by more than 5% of an original cross-section, ii) a wall thickness of the modified peripheral configuration within ±10% of an original wall thickness, and iii) the amount of metal per unit length greater than that of at least some other portions thereof;

securing a suspension mount to each of the side frame members at said at least one longitudinal portion thereof having the transverse cross-section increased by more than 5% of the original cross-section and said wall thickness within ±10% of the original wall thickness; and connecting the front cross frame member with forward ends of said side frame members, and the rear cross frame member with rearward ends of said side frame members.

15. The method according to claim 14, further comprising inwardly forcing opposite ends of each metallic tubular blank while providing said fluid therein so as to replenish a wall thickness of the metallic tubular blank as the metallic tubular blank is expanded so that the wall thickness of the expanded metallic tubular metal blank remains within ±10% of the original blank wall thickness.

16. The method according to claim 14, wherein said securing of the suspension mount to each of said side frame members is accomplished by welding.

17. The method as claimed in claim 14, wherein said at least one longitudinal portion has said transverse cross-section increased by more than 26% of the original cross-section.

18. A cradle assembly for a motor vehicle comprising:

a pair of spaced side frame members having front and rear ends;

a front cross frame member extending between the front ends of said side frame members; and a rear cross frame member extending between the rear ends of said side frame members;

said rear cross frame member and said side frame members each having a substantially rectangular transverse cross-section defined by a pair of spaced generally horizontal walls and a pair of spaced generally vertical walls, each of said walls including an interior and exterior surface;

said rear cross frame member having fastener receiving sleeve members at opposite ends thereof extending through one of said spaced horizontal walls thereof and engaging the interior surface of the other of said spaced horizontal walls thereof, and said side frame members each having fastener receiving sleeve members at said rear ends thereof extending through one of said spaced horizontal walls thereof and engaging the interior surface of the other of said spaced horizontal walls thereof, said fastener receiving sleeve members at said opposite ends of the rear cross frame member being aligned with respective fastener sleeve members at the rear ends of said side frame members;

fasteners each extending through the respective aligned fastener receiving sleeve members at said opposite ends of said rear cross frame member and said rear ends of the side frame members, said fasteners being constructed and arranged to fasten the opposite ends of said rear cross frame member with the respective rear ends of the side frame members, said rear cross frame member having the exterior surface of said other of said horizontal walls thereof disposed in surface-to-surface engagement at said opposite ends thereof with the exterior surface of said other of said horizontal walls of said respective rear ends of said side frame members.

19. A cradle assembly according to claim 18, wherein said sleeve members have one end thereof annularly welded at said engagement with the interior surface of the associated frame member in surrounding relation to associated first openings in the horizontal wall disposed in surface-to-surface engagement, said sleeve members including an intermediate portion extending from said one end through an inner space of the associated frame member and through second openings the horizontal wall spaced from the wall in surface-to-surface engagement, said first openings being vertically aligned with said second openings, said sleeve members having an opposite ends extending radially outwardly so as to define a flange engaging the exterior surface of the associated frame member about said second of said vertically aligned openings in the horizontal wall spaced from the wall in surface-to-surface engagement.

20. A cradle assembly according to claim 19, wherein for each pair of aligned sleeve members, at least one of said aligned sleeve members with said pair has threads along the intermediate interior portion thereof, and wherein said fasteners each comprise a threaded stem constructed and arranged to be threadedly engaged with the threaded intermediate portion of said at least one of the sleeve members within said pair, and a fastener head constructed and arranged to engage the flange of one of said aligned sleeve members within said pair to enable said fastener to pull the exterior surfaces disposed in surface-to-surface engagement into rigidly fixed engagement with one another when said fastener is tightened.

21. The cradle assembly according to claim 18, wherein said rear ends of said side frame members and opposite ends of said front cross frame member are constructed and arranged to enable said cradle assembly to be secured a frame of the motor vehicle, said front cross frame member having a substantially rectangular cross-section defined by a pair of spaced horizontal walls and a pair of spaced vertical walls, each of said walls including an interior and exterior surface, said rear ends of the side frame members and the opposite ends of the front cross frame member each include vehicle frame fastener receiving portions for securing the cradle assembly with the vehicle frame, said vehicle frame fastener receiving portions each including vertically aligned openings in said spaced horizontal walls of the associated frame member and a sleeve member extending between said openings, each said sleeve member having one end annularly welded to an interior surface of the associated frame member about said opening in one of the horizontal walls which is to engage the vehicle frame, said sleeve member including an intermediate portion extending from the annular weld through the associated frame member and through one of the vertically aligned openings in the horizontal wall spaced from the horizontal wall which is to engage the vehicle frame, said sleeve member having an opposite end extending radially outwardly to define a flange engaging an exterior surface of the associated frame member about the one of the vertically aligned openings in the horizontal wall spaced from the horizontal wall which is to engage the vehicle frame.

22. The cradle assembly according to claim 21, wherein said vehicle frame fastener receiving portions each further include concentrically disposed inner and outer interior sleeves extending concentrically within each sleeve member, said vehicle frame fastener receiving portions further including a resilient material disposed between said interior sleeves, said inner interior sleeve being adapted to receive a fastener therethrough to secure the associated frame member with the vehicle frame.

* * * * *